United States Patent
Noro et al.

(10) Patent No.: US 8,257,042 B2
(45) Date of Patent: Sep. 4, 2012

(54) FLUID DRIVE DEVICE

(75) Inventors: Takashi Noro, Nagoya (JP); Hiroaki Takeuchi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 603 days.

(21) Appl. No.: 12/445,677

(22) PCT Filed: Nov. 1, 2007

(86) PCT No.: PCT/JP2007/071676
§ 371 (c)(1),
(2), (4) Date: Apr. 15, 2009

(87) PCT Pub. No.: WO2008/054028
PCT Pub. Date: May 8, 2008

(65) Prior Publication Data
US 2010/0296919 A1   Nov. 25, 2010

(30) Foreign Application Priority Data
Nov. 2, 2006   (JP) .................................. 2006-299429

(51) Int. Cl.
*F01D 5/22* (2006.01)
(52) U.S. Cl. .......................... 416/180; 415/140; 415/190
(58) Field of Classification Search .................. 415/140, 415/190; 416/180
See application file for complete search history.

(56) References Cited

U.S. PATENT DOCUMENTS
4,584,835 A * 4/1986 Nishi .............................. 60/330

FOREIGN PATENT DOCUMENTS

| JP | 55-110857 | U | | 8/1980 |
|---|---|---|---|---|
| JP | 61-198762 | U | | 12/1986 |
| JP | 2-3003 | Y2 | | 1/1990 |
| JP | 02-056960 | | * | 4/1990 |
| JP | 2-56960 | U | | 4/1990 |
| JP | 2-125247 | U | | 10/1990 |
| JP | 5-346153 | A | | 12/1993 |
| JP | 06-094099 | | * | 4/1994 |
| JP | 7-091517 | A | | 4/1995 |
| JP | 2003-247625 | A | | 9/2003 |

* cited by examiner

*Primary Examiner* — Zandra Smith
*Assistant Examiner* — Jamie C Niesz
(74) *Attorney, Agent, or Firm* — Sughrue Mion, PLLC

(57) ABSTRACT

A torque converter includes a pump shell constituting an internal space for retaining ATF and capable of rotating about the rotation axis; a blade engaging with the pump shell; and an extension sleeve pressing the blade against the pump shell. The pump shell has a groove into which a tip portion of the blade is fit formed at its inner peripheral surface. In the state where the tip portion is fit into the groove, the extension sleeve presses the blade to fix the blade to the pump shell. The groove forms an acute angle θ with respect to a meridian of the shell passing through the groove. The groove extends in one direction, has one end opened and the other end closed, and has a width larger on the side of the one end than on the side of the other end. The groove has a portion smallest in width equal to the width of the tip portion.

1 Claim, 8 Drawing Sheets

FLUID DRIVE DEVICE

TECHNICAL FIELD

The present invention relates to a fluid drive device, and more particularly to a fluid drive device provided with a blade engaging with a shell.

BACKGROUND ART

Conventionally, the fluid drive device is disclosed, for example, in Japanese Utility Model Publication No. 2-3003, Japanese Utility Model Laying-Open No. 2-56960, Japanese Utility Model Laying-Open No. 2-125247, and Japanese Patent Laying-Open No. 05-346153.

DISCLOSURE OF THE INVENTION

Conventionally, there has been a technique in which an extension sleeve is provided in a fluid drive device such as a fluid coupling to directly pressing the edge of the blade with a tapered pressing portion of the extension sleeve for fixing the blade without welding performed within the fluid coupling. There is a tendency to attach the blade in the horizontally laid state because of the downsized and flattened fluid coupling. Furthermore, the embossed portion used for attaching the blade is provided with a sufficient width as a margin with respect to the thickness of the blade tab, to thereby ensure the attachability. In the case where the direction of application of pressure by the pressing portion is not perpendicular to the pressure-receiving surface of the blade tab, when the edge portion of the blade is pressed, the positioning of the blade tab within the embossed portion may not be stabilized due to the margin provided in the width direction, leading to variations in the attitude of the blade being attached. This poses problems that the power transmitting performance and the durability of the blade may be deteriorated.

The present invention aims to solve the above-described problems, and an object of the present invention is to provide a fluid drive device capable of reliably fixing a blade to a shell.

The fluid drive device according to the present invention includes a shell constituting an internal space for retaining a working fluid and capable of rotating about a rotation axis; a blade engaging with the shell; and a pressing member pressing the blade against the shell. The shell has a groove into which a portion of the blade is fit formed at the inner peripheral surface. In the state where the portion of the blade is fit into the groove, the pressing member presses the blade to fix the blade to the shell. The groove forms an acute angle θ with respect to a meridian of the shell passing through the groove. The groove extends in one direction, has one end opened and the other end closed, and has a width larger on the side of the one end than on the side of the other end. The groove is designed to have a portion smallest in width to be equal to the width of the blade.

In the fluid drive device configured in this way, the groove has one end opened which is designed to have a relatively large width, with the result that the attachability of the blade to the shell is ensured. Furthermore, since the groove has a portion smallest in width equal to the width of the blade, this portion allows a part of the blade to be reliably held. Accordingly, as the position of the blade pressed and fixed by the pressing member is reliably set, the variations in the attitude of the blade to be attached can be suppressed. Consequently, the power transmitting performance of the fluid drive device and the durability of the blade can be improved.

Preferably, the groove is designed to have a width at the other end equal to the width of the portion of the blade.

More preferably, the width of the groove varies in a depth direction of the groove and is larger in a shallow portion than in a deep portion of the groove.

More preferably, the shell includes first and second side surfaces facing each other and extending from one end to the other end to define the groove. The blade applied with a pressing force has a portion brought into contact with the first side surface and is located to provide a gap between the blade and the second side surface.

According to the present invention, a fluid drive device in which a blade is stably attached to a shell can be provided.

BEST MODES FOR CARRYING OUT THE INVENTION

Figure 1:
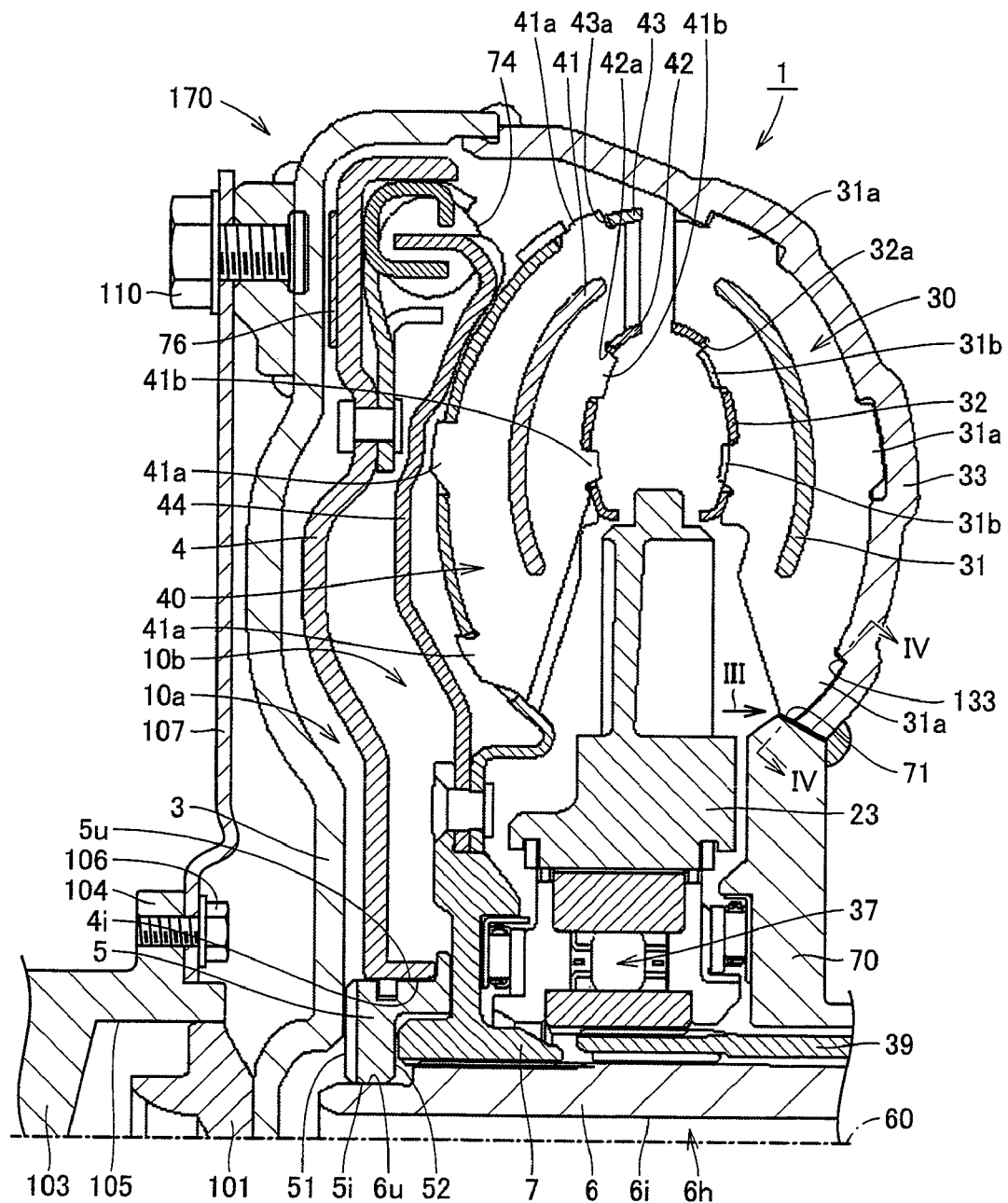
FIG. 1 is a cross sectional view of a torque converter according to a first embodiment of the present invention.

The embodiments of the present invention will be hereinafter described with reference to the accompanying drawings, in which the same or corresponding components in each embodiment are designated by the same reference characters, and description thereof will not be repeated. Each embodiment can also be combined.

First Embodiment

FIG. 1 is a cross sectional view of a torque converter according to a first embodiment of the present invention. Referring to FIG. 1, a torque converter 1 serves as an apparatus for transmitting the torque from a crankshaft 103 of the engine to an output shaft 6. The engine is disposed at the left in FIG. 1 and the transmission is disposed at the right in FIG. 1. Crankshaft 103 and output shaft 6 can be rotated about a rotation axis 60.

Torque converter 1 is comprised of a fluid working chamber and a lock-up mechanism 170. The fluid working chamber has three types of impellers including a turbine runner 40, a pump impeller 30 and a stator 23. A disk-shaped front cover 3 is disposed on the front side of torque converter 1, that is, on the side closer to the engine, and is located so as to extend from rotation axis 60 to the outside, that is, to extend in the radial direction. Front cover 3 serves as a front housing of torque converter 1. A pump shell 33 is fixed to front cover 3. Front cover 3 and pump shell 33 provide a predetermined space in which various components of torque converter 1 are arranged. The space surrounded by torque converter 1 and an impeller shell (pump shell) 33 is almost sealed, in which automatic transmission fluid (ATF) as a working fluid is enclosed.

Front cover 3 serves as a member receiving the power from the engine. When the power is input from crankshaft 103 of the engine through a drive plate 107 to front cover 3, front cover 3 is rotated and this rotation force is transmitted to pump shell 33. Pump shell 33 constitutes pump impeller 30 and serves as a component member located outside pump impeller 30. Pump impeller 30 is disposed so as to face turbine runner 40 and can be rotated about rotation axis 60 of output shaft 6. Pump impeller 30 is provided with a blade 31 formed in such a shape that the ATF is pushed toward turbine runner 40. When pump impeller 30 is rotated, the ATF in the vicinity of pump impeller 30 is pushed by blade 31 toward turbine runner 40.

Stator 23 is interposed between pump impeller 30 and turbine runner 40, and serves to change the flow direction of the ATF flowing from turbine runner 40 to pump impeller 30. Stator 23 is attached to a fixed shaft 39 with a one-way clutch 37 interposed therebetween and can be rotated only in one direction. As for one-way clutch 37, the structure using a roller, a sprag or a ratchet can be employed. Stator 23 serves as a vane for regulating the flow of the ATF which runs through turbine runner 40 back to pump impeller 30, and is made of resin or aluminum.

Turbine runner 40 includes a turbine shell 43 constituting a space in which the ATF is circulated, and is disposed so as to face pump impeller 30. Turbine runner 40 receives the ATF discharged by pump impeller 30 and is applied with the rotation force by this ATF. The ATF transmitted to turbine runner 40 flows to the inner peripheral side and is delivered through stator 23 again to pump impeller 30. Turbine runner 40 can be rotated independently of pump impeller 30.

While pump impeller 30 rotates integrally with front cover 3, turbine runner 40 rotates integrally with a lock-up piston 4. A power transmitting member 44 is disposed so as to be brought into contact with turbine shell 43. Power transmitting member 44 is integrated with turbine shell 43 by a fastening member such as a rivet or a bolt, and rotated together with turbine shell 43.

Power transmitting member 44 and turbine shell 43 are both fixed to turbine hub 7. Power transmitting member 44 and turbine shell 43 can be rotated about turbine hub 7 as well as output shaft 6 as rotation axis 60. Turbine hub 7 is spline fit to output shaft 6 and located on the outer peripheral side of output shaft 6. Turbine hub 7 connects output shaft 6 to turbine shell 43 and serves to transmit to output shaft 6 the rotation input to turbine shell 43.

Blade 31 includes tip portions 31a and 31b as a tab. Tip portion 31a engages with pump shell 33 and tip portion 31b is inserted into a pump core 32.

Blade 41 includes tip portions 41a and 41b as a tab. Tip portion 41a is inserted into turbine shell 43 and tip portion 41b is inserted into a turbine core 42.

Crankshaft 103 as an input shaft has a tip provided with a concave portion 105 into which a center piece 101 is fit. Center piece 101 serves as a member for positioning torque converter 1 with respect to crankshaft 103. Crankshaft 103 includes a flange portion 104 to which drive plate 107 is fixed using a bolt 106. Drive plate 107 is fixed to both of crankshaft 103 and front cover 3, and serves as a power transmitting path from crankshaft 103 to front cover 3.

Bolt 106 is used to fix drive plate 107 to flange portion 104, and bolt 110 is used to fix drive plate 107 to front cover 3.

Lock-up mechanism 170 serves as an apparatus for directly transmitting the rotation force of front cover 3 to output shaft 6, in which a facing 76 as a friction member is brought into contact with the inner peripheral surface of front cover 3, causing the rotation force of front cover 3 to be transmitted to output shaft 6. Lock-up mechanism 170 includes lock-up piston 4 for attaching facing 76. Lock-up piston 4 can be moved in the axial direction, that is, in the direction approaching front cover 3 and in the direction away from front cover 3, to thereby allow facing 76 to abut front cover 3. Lock-up piston 4 is in the shape of a disk extending in the radial direction of the rotation and disposed so as to face front cover 3.

Facing 76 is fixed on the outer peripheral side of lock-up piston 4 and comes into contact with a washer 5 located on the inner peripheral side of lock-up piston 4. Lock-up piston 4 has an inner peripheral surface 4i which is directly in contact with washer 5. Washer 5 surrounds the end of output shaft 6 and serves to seal the lock-up pressure. Washer 5 has an outer peripheral surface 5u facing lock-up piston 4, an inner peripheral surface 5i in contact with output shaft 6, a friction surface 51 in contact with front cover 3, and an acting surface 52 in contact with turbine hub 7.

The space between front cover 3 and lock-up piston 4 corresponds to a first hydraulic chamber 10a, and the space between lock-up piston 4 and power transmitting member 44 corresponds to a second hydraulic chamber 10b. Each of first and second hydraulic chambers 10a and 10b is filled with the ATF. The hydraulic pressure of the ATF is changed to allow lock-up piston 4 to be moved in the direction approaching front cover 3 and in the direction away from front cover 3.

Lock-up piston 4 is provided with a lock-up damper 74 that serves to reduce the input variations. Lock-up damper 74 is interposed between lock-up piston 4 and power transmitting member 44.

The operation of lock-up mechanism 170 will be hereinafter described. When the torque-amplifying function of torque converter 1 is not particularly required, facing 76 is directly brought into contact with front cover 3 to cause the rotation force of front cover 3 to be directly transmitted to output shaft 6. Specifically, the ATF in first hydraulic chamber 10a is discharged via a through hole 6h. This causes the hydraulic pressure in first hydraulic chamber 10a to be lowered below the hydraulic pressure in second hydraulic chamber 10b, with the result that lock-up piston 4 is moved in the direction approaching front cover 3 to bring facing 76 into contact with front cover 3. Consequently, the power of front cover 3 is transmitted through facing 76, lock-up piston 4, power transmitting member 44, and turbine hub 7 to output shaft 6. In this case, there is almost no power loss resulting from torque converter 1.

In the case where the torque-amplifying function of torque converter 1 is required, the ATF is fed into first hydraulic chamber 10a via through hole 6h, which causes the pressure in first hydraulic chamber 10a to be raised to push lock-up piston 4 back in the direction away from front cover 3. This results in a gap created between front cover 3 and facing 76, which prevents the rotation force of front cover 3 from being directly transmitted to facing 76.

Figure 2:
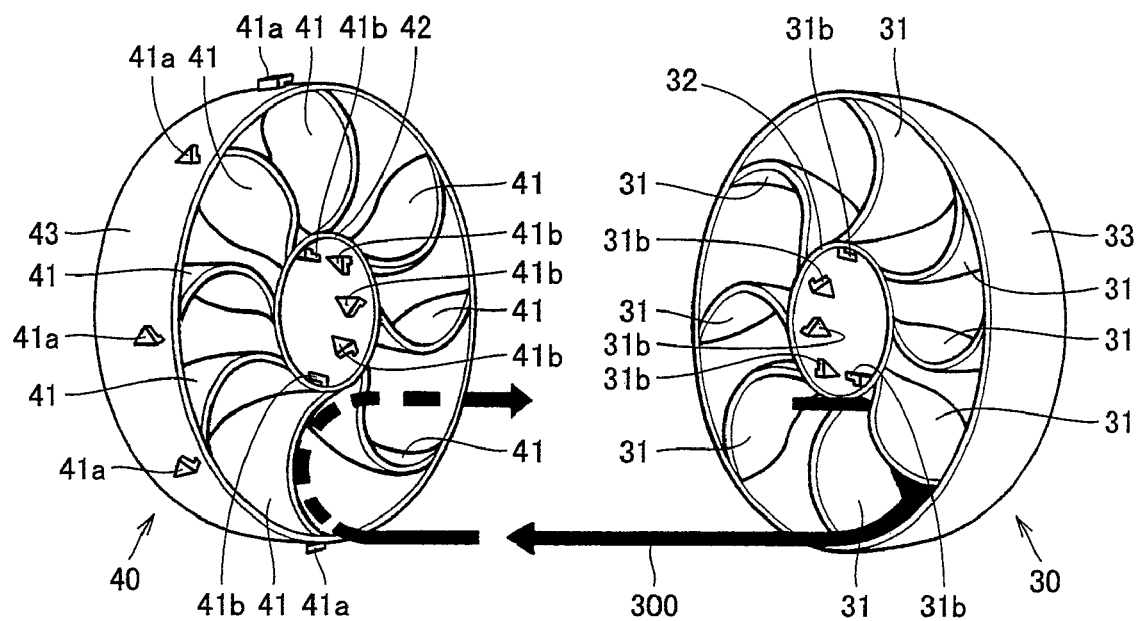
FIG. 2 is a schematic diagram for illustrating power transmission in the torque converter.

FIG. 2 is a schematic diagram for illustrating power transmission in the torque converter. Referring to FIG. 2, pump impeller 30 includes pump shell 33 as a rotor, pump core 32 located on the inner side in the radial direction so as to face pump shell 33, and blade 31 fixed to pump core 32 and pump shell 33. Blade 31 has tip portion 31b which is inserted into pump core 32.

Turbine runner 40 that faces pump impeller 30 includes turbine shell 43 as an outside housing, turbine core 42 located inside turbine shell 43, and blade 41 fixed to turbine core 42 and turbine shell 43.

Blade 41 has tip portions 41a and 41b. Tip portion 41a is inserted into turbine shell 43 and tip portion 41b is inserted into turbine core 42. Blades 31 and 41 each serve as a vane for causing the ATF to be worked. When pump impeller 30 is rotated, the ATF near the center is pushed out along blade 31 and the outer wall to the turbine runner 40 side, causing the ATF to flow in the direction shown by an arrow 300. On the turbine runner 40 side, the ATF flows from the outside toward the center thereof.

Thus, since blade 31 is applied with pressure from the ATF, blade 31 should be firmly fixed to pump shell 33, which requires an extension sleeve 70 to be provided. Extension sleeve 70 extends from the center of the rotation along pump shell 33 toward the outer periphery and has an end face 71 which is brought into contact with blade 31 to press blade 31 in the direction of pump shell 33. This pressing force causes tip portion 31a of blade 31 to firmly engage with pump shell 33.

Figure 3:
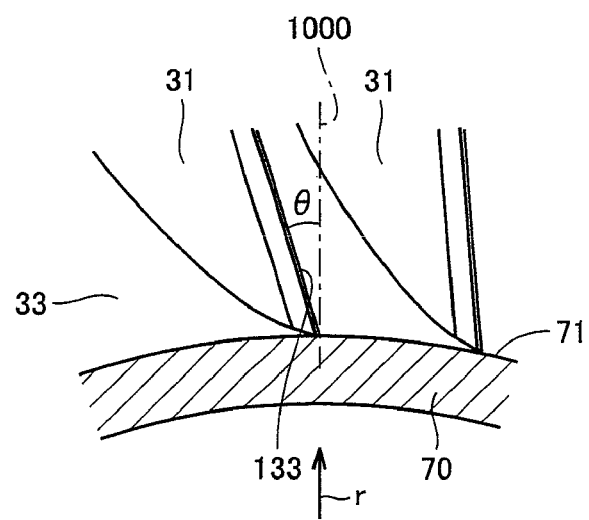
FIG. 3 is a front view of a blade as seen from the direction shown by an arrow III in FIG. 1.

FIG. 3 is a front view of the blade as seen from the direction shown by an arrow III in FIG. 1. Referring to FIG. 3, a groove 133 into which blade 31 is fit forms an acute angle θ with respect to a meridian 1000 of the shell which passes through groove 133. Pump shell 33 has groove 133 into which blade 31 is fit. Blade 31 is pressed by end face 71 of extension sleeve 70 and fixed to pump shell 33 by this pressing force.

Figure 4:
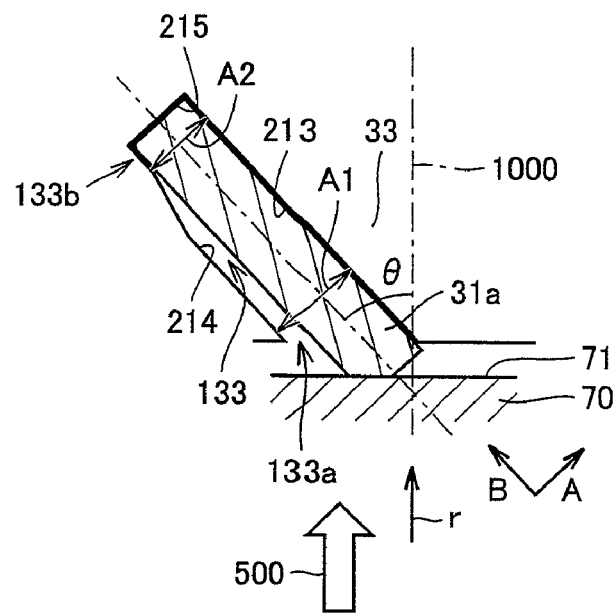
FIG. 4 is a cross sectional view taken along a line IV-IV in FIG. 1.

FIG. 4 is a cross sectional view taken along a line IV-IV in FIG. 1. Referring to FIG. 4, groove 133 has one end 133a and the other end 133b. Groove 133 has a width A1 larger on the side of one end 133a and a width A2 smaller on the side of the other end 133b. The direction orthogonal to the width direction of the groove shown by an arrow A corresponds to the longitudinal direction of the groove shown by an arrow B. Groove 133 has a first side surface 213 and a second side surface 214 which face each other and are connected by a back plane 215. The groove width may continuously vary or may vary sharply in a certain portion. Although, in the present embodiment, groove 133 has a width A smallest on the side of the other end 133b, the present invention is not limited thereto, and groove 133 may have a width smallest in the intermediate portion (between one end 133a and the other end 133b) of groove 133. First side surface 213 abuts tip portion 31a and has a shape adapted to tip portion 31a. In contrast, second side surface 214 is inclined with respect to tip portion 31a and is shaped to create a gap between second side surface 214 and tip portion 31a. Tip portion 31a is pressed by end face 71 of extension sleeve 70. This pressing force causes tip portion 31a to abut first side surface 213. Tip portion 31a is fixed to pump shell 33 by this abutting force.

The ATF flows in the direction shown by an arrow 500 and collides with blade 31. Accordingly, blade 31 is always applied with the force by the ATF. Downsized and flattened torque converter 1 has a tendency to cause an increase in an inclination angle θ of blade 31 of the pump. In the case where the direction of application of pressure by extension sleeve 70 is not perpendicular to the pressure-receiving surface of tip portion 31a, when the edge portion of blade 31 is pressed, the positioning of tip portion 31a within groove 133 as an embossed portion may not be stabilized, which may cause variations in the attitude of blade 31. On the other hand, in the present invention, groove 133 has a portion nearly equal in width to tip portion 31a, which allows a reliable positioning of tip portion 31a.

Although extension sleeve 70 is configured as an integral component in the present embodiment, extension sleeve 70 may be configured using other components such as a retainer ring.

There are a plurality of meridians of the shell each corresponding to a line of intersection between the plane including rotation axis 60 and the inner peripheral surface of pump shell 33. Meridian 1000 of the shell shown in FIG. 4 passes through the side of one end 133a of groove 133.

Figure 5:
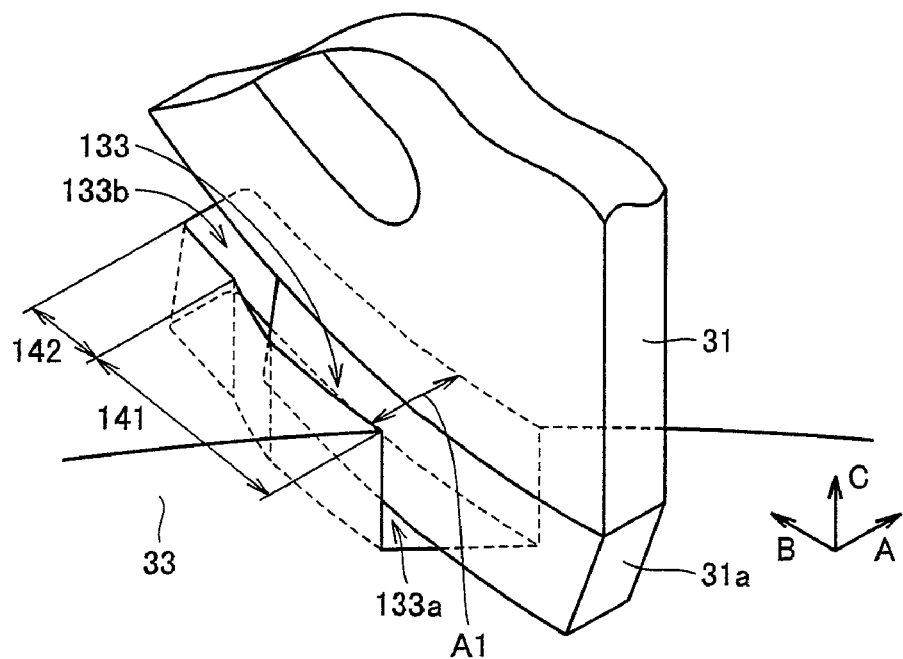
FIG. 5 is a perspective view shown for illustrating the relationship between a groove and the blade.
Figure 6:
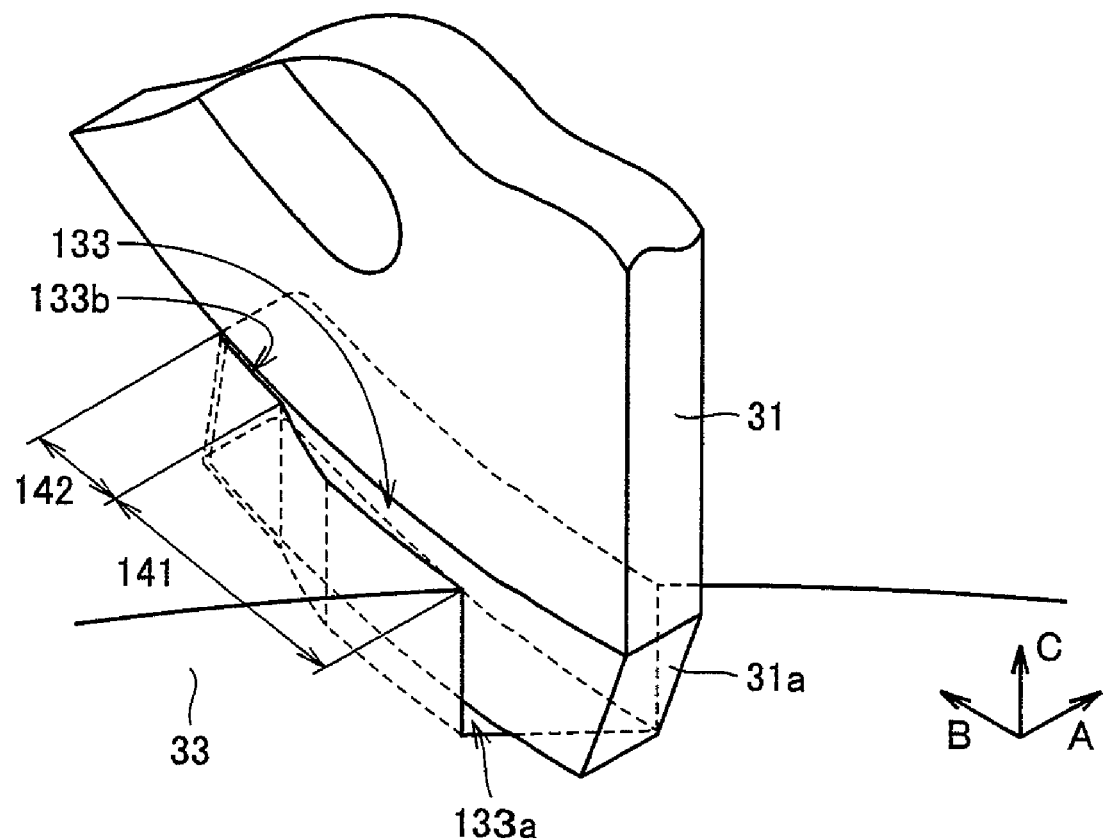
FIG. 6 is a perspective view shown for illustrating the relationship between the groove and the blade.

FIGS. 5 and 6 each are a perspective view shown for illustrating the relationship between the groove and the blade. Referring to FIG. 5, at the time of installation, tip portion 31a of blade 31 is first inserted on the one end 133a side in groove 133: In this case, as width A1 at one end 133a is relatively large, tip portion 31a can be readily inserted into groove 133, leading to an improvement in installability. In other words, the area closer to one end 133a corresponds to a region 141 having a relatively large groove width, and the area closer to the other end 133b corresponds to a region 142 having a relatively small groove width.

Referring to FIG. 6, tip portion 31a is fit into the other end 133b when it is pressed. This allows blade 31 to be positioned in region 142 having a relatively small groove width. Blade 31 is inserted in the longitudinal direction shown by an arrow B and then pressed by the extension sleeve. Thus, tip portion 31a firmly engages with groove 133 at the other end 133b.

Torque converter 1 as a fluid drive device includes pump shell 33 constituting an internal space for retaining the ATF and capable of rotating about rotation axis 60; blade 31 engaging with pump shell 33; and extension sleeve 70 as a pressing member pressing blade 31 against pump shell 33. Pump shell 33 has groove 133 into which tip portion 31a of blade 31 is fit formed at the inner peripheral surface. In the state where tip portion 31a is fit into groove 133, extension sleeve 70 presses blade 31 to fix blade 31 to pump shell 33. The meridian of the shell extends in the direction in which the straight line runs which is obtained by projecting a line in the radial direction of rotation of pump shell 33 onto the inner surface of pump shell 33. Meridian 1000 of the shell in FIG. 4 passes through the contact point between pump shell 33 and extension sleeve 70. Groove 133 forms an acute angle θ with respect to meridian 1000 of the shell that passes through groove 133. Groove 133 extends in one direction, has one end 133a opened and the other end 133b closed, and has a width larger on the side of one end 133a than on the side of the other end 133b. Groove 133 has a portion smallest in width approximately equal to the width of tip portion 31a of blade 31.

In the structure configured as described above according to the first embodiment, blade 31 can be reliably positioned in region 142 having a relatively small width. Thus, the position of blade 31 is uniquely determined.

Furthermore, since groove 133 has a width which is relatively large at one end 133a, the installability of blade 31 to pump shell 33 can be ensured.

Second Embodiment

Figure 7:
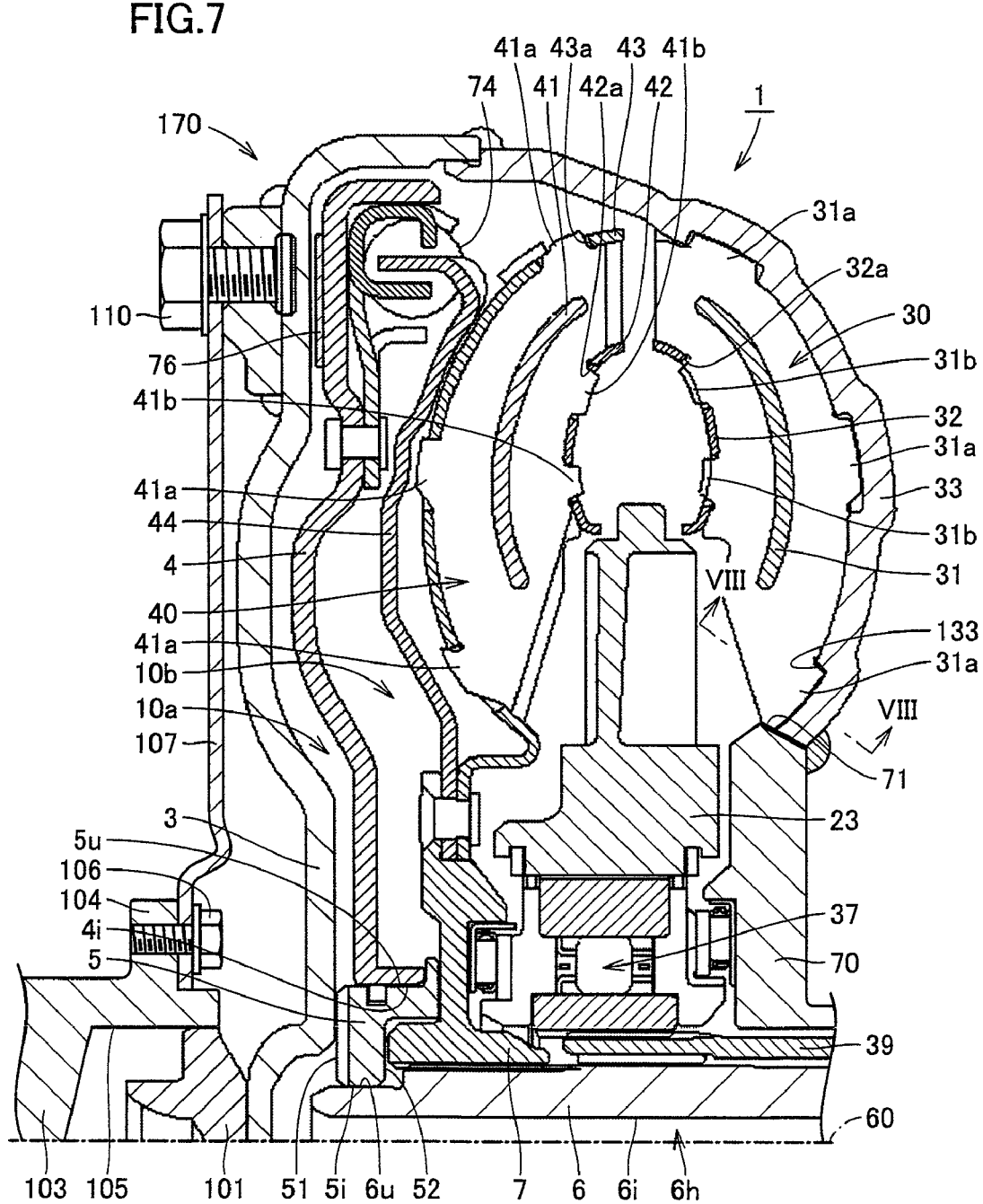
FIG. 7 is a cross sectional view of a torque converter according to a second embodiment of the present invention.
Figure 8:
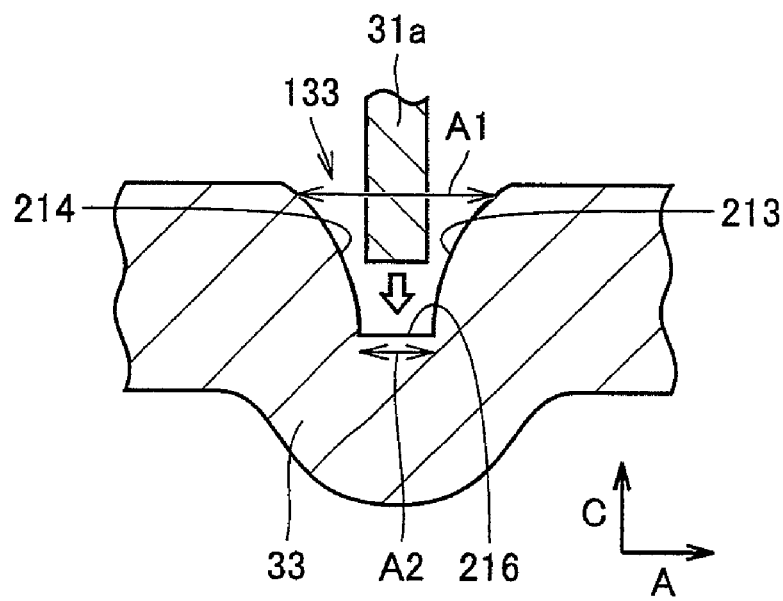
FIG. 8 is a cross sectional view taken along a line VIII-VIII in FIG. 7.

FIG. 7 is a cross sectional view of the torque converter according to the second embodiment of the present invention. FIG. 8 is a cross sectional view taken along a line VIII-VIII in FIG. 7. Referring to FIGS. 7 and 8, in torque converter 1 according to the second embodiment of the present invention, groove 133 is designed to have an inlet for installation which is relatively large in width with respect to the vertical direction of pump shell 33, with the result that the installability of blade 31 to pump shell 33 is ensured. In addition, groove 133 is designed to have a portion which is relatively small in width in the deep portion. This causes the position of blade 31 to be uniquely determined when blade 31 is pressed and fixed by the extension sleeve.

As shown in FIG. 8, first side surface 213 and second side surface 214 forming groove 133 are symmetrical to each other and arranged to continuously reduce the width of the groove. Groove 133 has a width A2 across a bottom surface 216 which is the smallest and a width A1 across the opening area which is the largest.

Figure 9:
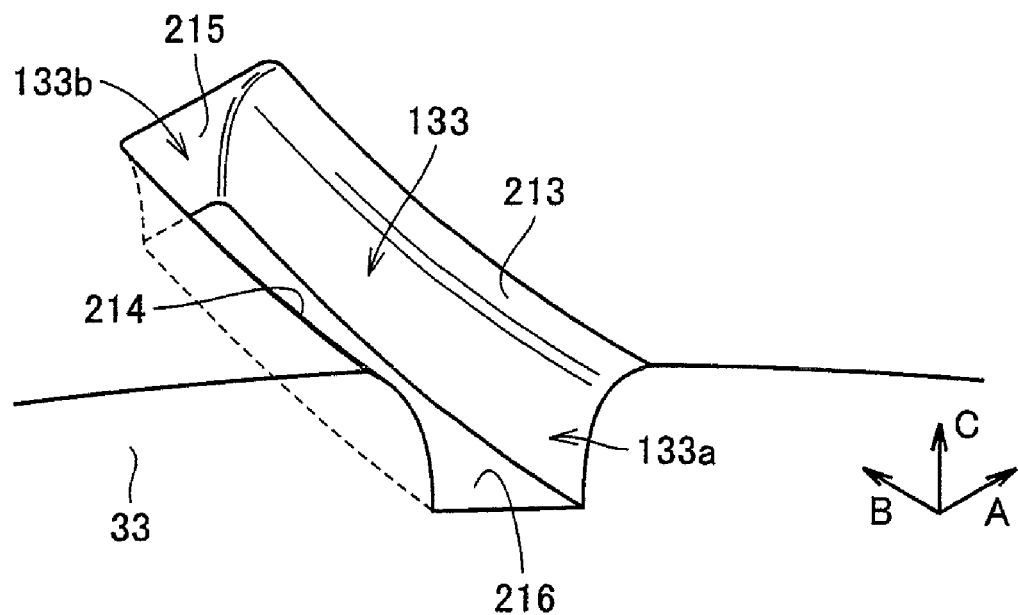
FIG. 9 is a perspective view of the groove shown in FIG. 8.

FIG. 9 is a perspective view of the groove shown in FIG. 8. Referring to FIG. 9, groove 133 extending in the longitudinal direction shown by an arrow B has a width in the direction shown by an arrow A which continuously varies in the depth direction shown by an arrow C. This width A corresponds to a distance between first side surface 213 and second side surface 214. First side surface 213 and second side surface 214 are curved to cause the distance to be continuously decreased with increasing proximity to bottom surface 216.

Torque converter 1 according to the second embodiment configured as described above also achieves an effect similar to that in the case of torque converter 1 according to the first embodiment.

Third Embodiment

Figure 10:
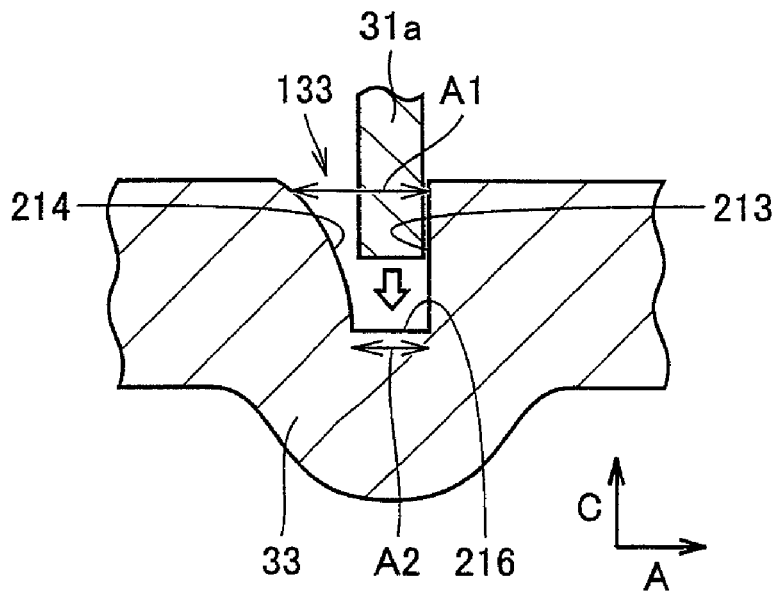
FIG. 10 is a cross sectional view of a groove and a blade according to a third embodiment of the present invention.
Figure 11:
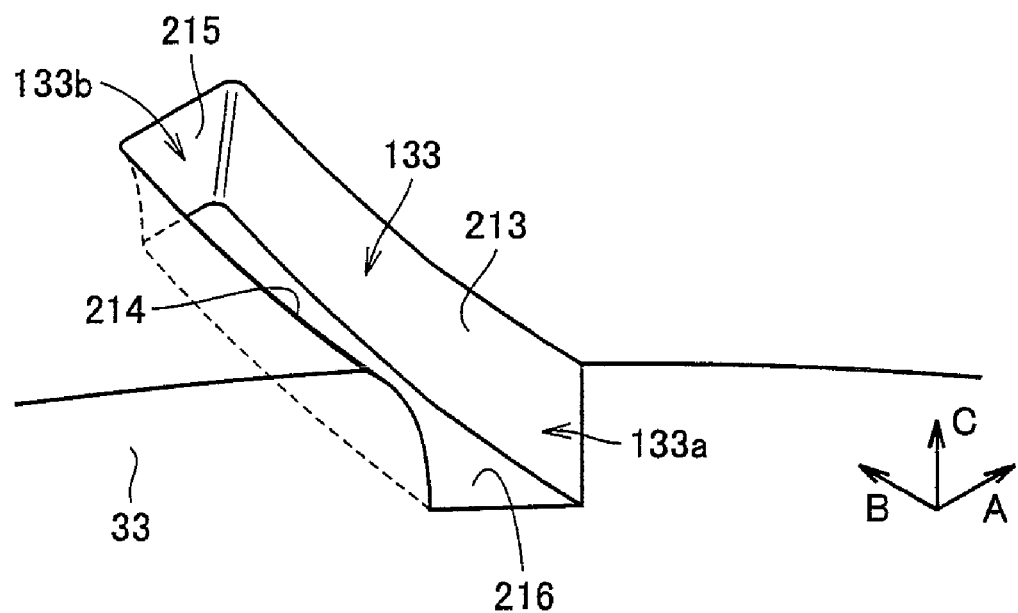
FIG. 11 is a perspective view of the groove shown in FIG. 10.

FIG. 10 is a cross sectional view of the groove and the blade according to the third embodiment of the present invention. FIG. 11 is a perspective view of the groove shown in FIG. 10. Referring to FIGS. 10 and 11, the torque converter according to the third embodiment of the present invention has groove 133 different from groove 133 according to the second embodiment in that first side surface 213 defining groove 133 is approximately parallel to the depth direction of groove 133 and second side surface 214 is inclined with respect to the depth direction of groove 133.

The torque converter according to the third embodiment configured as described above also achieves an effect similar to that in the case of the torque converter according to the first embodiment.

Fourth Embodiment

Figure 12:
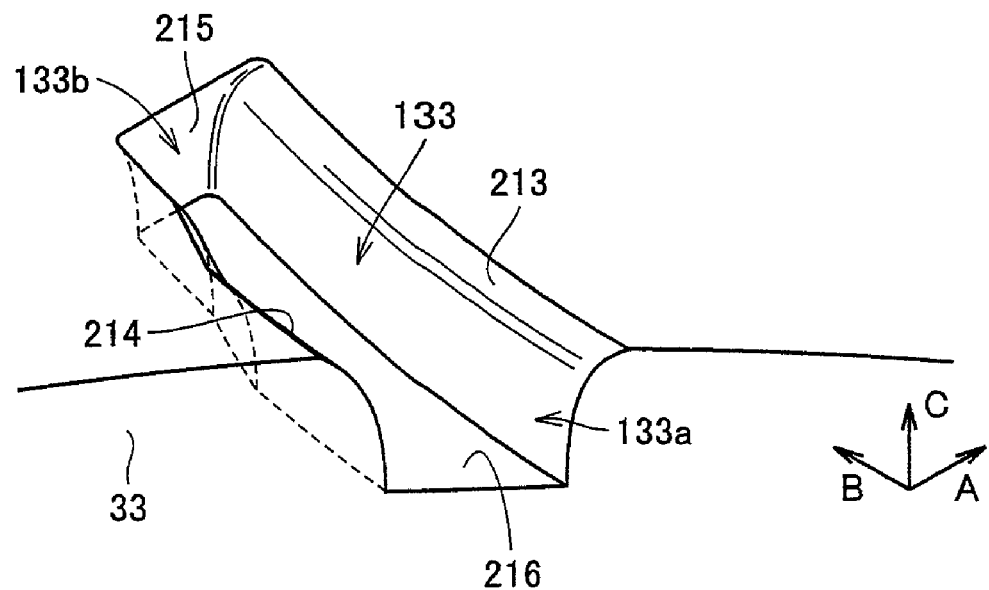
FIG. 12 is a perspective view of a groove of a pump shell used in a torque converter according to a fourth embodiment of the present invention.

FIG. 12 is a perspective view of the groove of the pump shell used in the torque converter according to the fourth embodiment of the present invention. Referring to FIG. 12, groove 133 according to the fourth embodiment of the present invention is configured to combine the groove according to the first embodiment and the groove according to the second embodiment. In other words, groove 133 has a width which is relatively large at one end 133a and relatively small at the other end 133b, and the width of groove 133 that also varies in the depth direction is reduced with increasing proximity to the deep portion.

The torque converter according to the fourth embodiment configured as described above also achieves an effect similar to that in the case of the torque converter according to the first embodiment.

Fifth Embodiment

Figure 13:
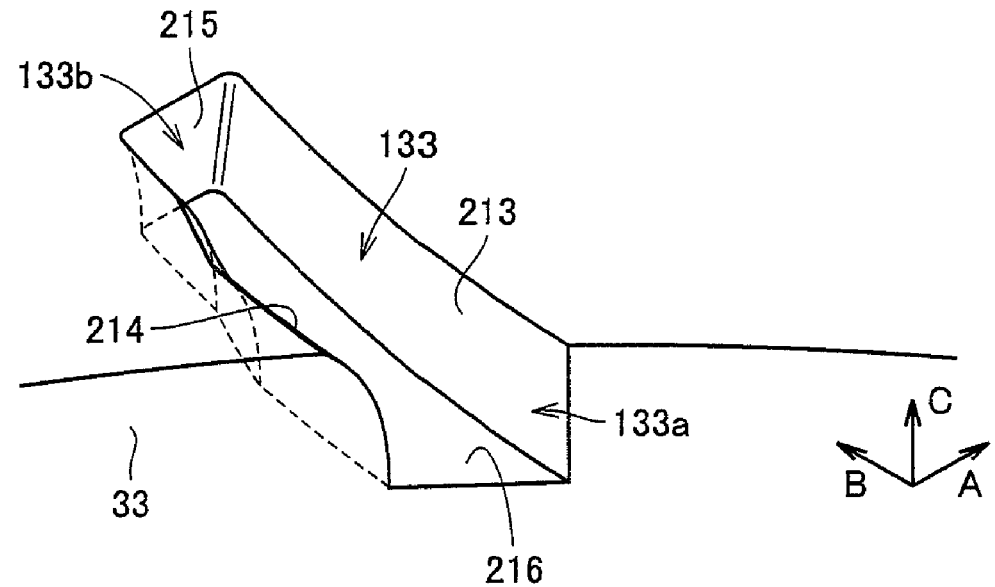
FIG. 13 is a perspective view of a groove of a pump shell used in a torque converter according to a fifth embodiment of the present invention.

FIG. 13 is a perspective view of the groove of the pump shell used in the torque converter according to the fifth embodiment of the present invention. Referring to FIG. 13, groove 133 according to the fifth embodiment of the present invention is configured to combine the groove according to the first embodiment and the groove according to the third embodiment. In other words, groove 133 has a width which is relatively large at one end 133a and relatively small at the other end 133b. Also, groove 133 is reduced in width along the depth direction with increasing proximity to the deep portion of groove 133. First side surface 213 is parallel to the depth direction shown by an arrow C and second side surface 214 is inclined with respect to the depth direction shown by arrow C.

The torque converter according to the fifth embodiment configured as described above also achieves an effect similar to that in the case of the torque converter according to the first embodiment.

Although the embodiments of the present invention have been described as above, the embodiments illustrated herein can be variously modified. Although the groove is provided in pump shell 33 in the above-described embodiments, the groove may be provided on the turbine shell 43 side to cause a turbine blade to engage with this groove. Furthermore, although the examples in which the present invention is applied to torque converter 1 have been described, the configuration of the present invention may be applied to the so-called fluid coupling lacking a torque-amplifying function. Furthermore, although the torque converter equipped with a lock-up mechanism has been described in the first embodiment, this lock-up mechanism may not be provided. Also, in place of the ATF, oil or water-soluble solution may be used as working fluid.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A fluid drive device comprising:
   a shell constituting an internal space for retaining a working fluid and capable of rotating about a rotation axis;
   a blade engaging with the shell; and
   a pressing member pressing said blade against said shell, said shell having a groove into which a portion of said blade is fit formed at an inner peripheral surface,
   in a state where the portion of said blade is fit into said groove, said pressing member pressing said blade to fix said blade to said shell,
   said groove forming an acute angle θ with respect to a meridian of the shell passing through the groove,
   said groove extending in a longitudinal direction, having one end opened and an other end closed, and having a width larger on a side of the one end than on a side of the other end,
   said groove designed to have a portion smallest in width in the longitudinal direction to be equal to a width of the portion of said blade, and a width of said groove varies in a depth direction of said groove and is larger in a shallow portion than in a deep portion of said groove, and
   said groove including first and second side surfaces facing each other and extending from said one end to said other end of said groove, and said blade applied with a pressing force having a portion brought into contact with the entire first side surface and located to provide a gap between said blade and said second side surface.

* * * * *